Patented July 26, 1927.

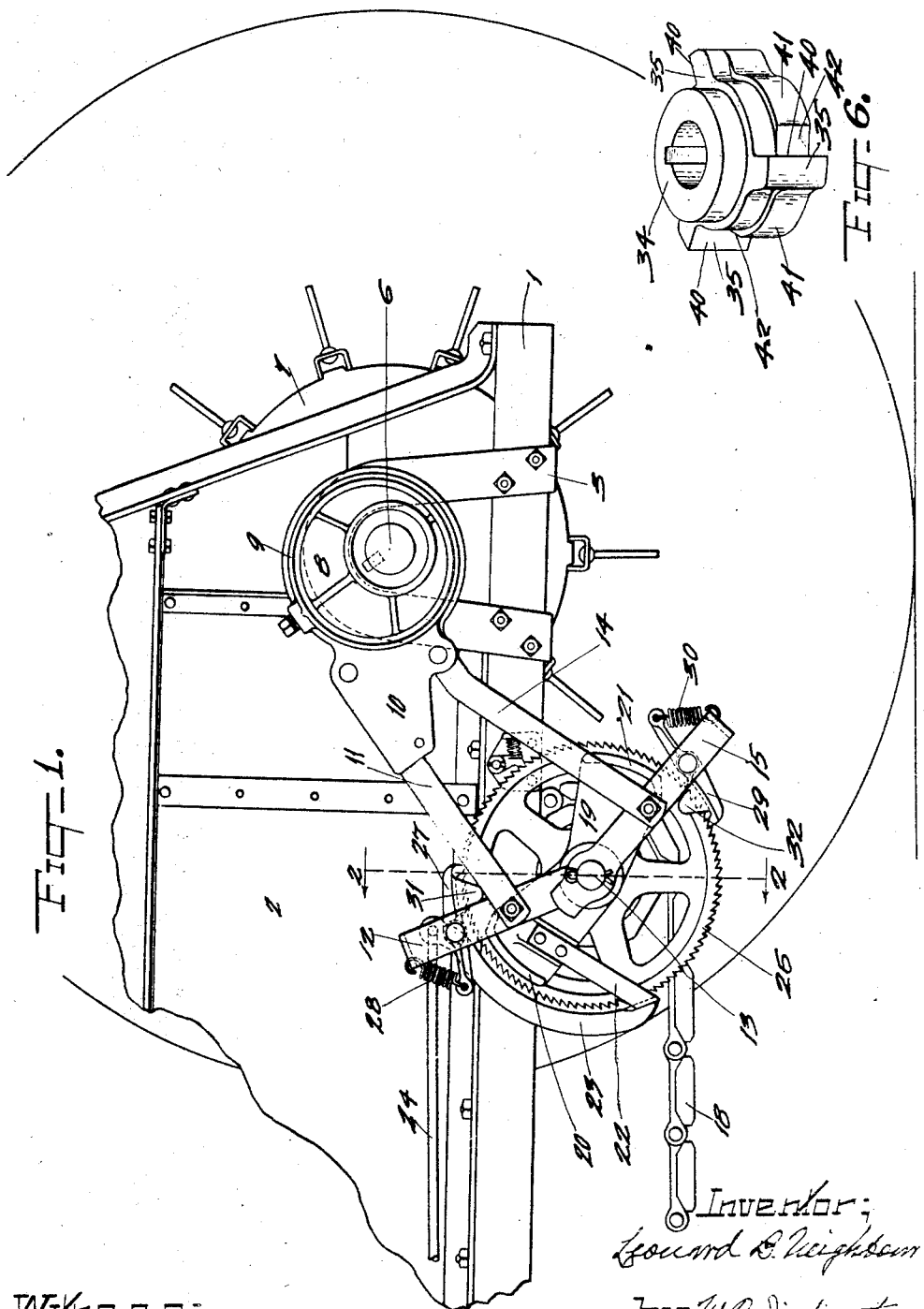

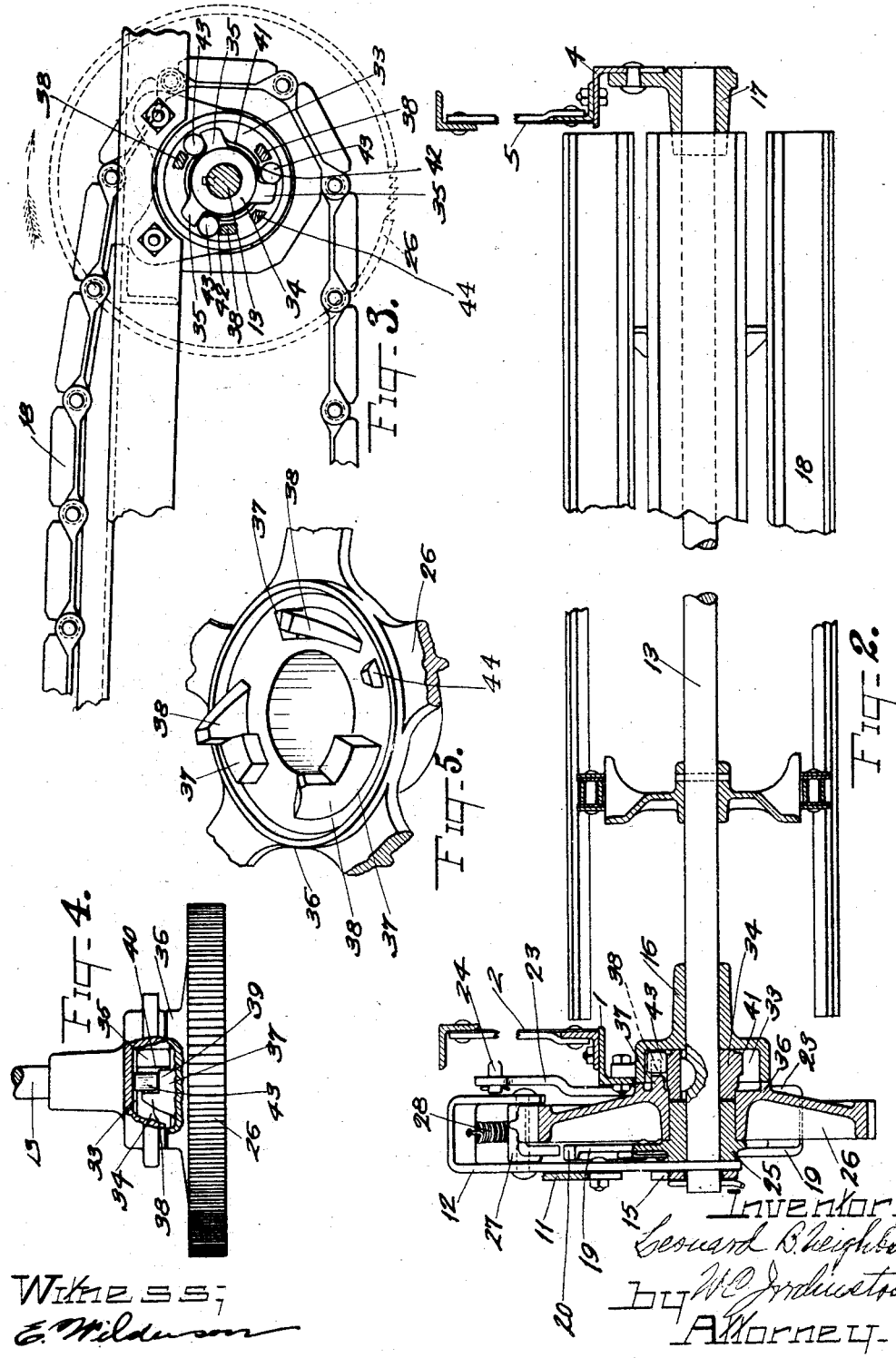

1,637,232

UNITED STATES PATENT OFFICE.

LEONARD B. NEIGHBOUR, OF MOLINE, ILLINOIS, ASSIGNOR TO DEERE & COMPANY, OF MOLINE, ILLINOIS, A CORPORATION OF ILLINOIS.

MANURE SPREADER.

Application filed April 3, 1924. Serial No. 703,920.

My invention relates to manure spreaders, and more particularly to the mechanism by which the conveyor apron is actuated and combining therewith a device for controlling the speed of travel of the apron, and the object of my invention is to provide such a device in the form of a brake mechanism automatically operating to check overspeeding of the conveyor, or apron, of the spreader.

Referring to the drawings, in which similar numerals indicate identical parts—

Figure 1 is a side elevation of as much of the rear part of a manure spreader thought necessary to illustrate the application of my invention.

Figure 2 is an enlarged detail section on the line 2—2 of Figure 1.

Figure 3 is an enlarged detail section of the brake mechanism.

Figure 4 is a detail plan of the ratchet gear with the hub thereof broken away to show, in part, the brake mechanism.

Figure 5 is an enlarged view, in perspective, of the brake side of the ratchet gear hub, and Figure 6 is a perspective view of part of the brake mechanism.

The part of the spreader shown includes a sill 1 on which is mounted the body 2, and 3 is an inverted U-shaped bracket secured on the sill 1. The opposite side of the spreader is similarly constructed with a sill 4, a body side 5 and a bracket, the brackets supporting suitable bearings in which is journaled the rear axle 6 of the spreader carrying the supporting wheels, one of which is shown in outline. The beater 7 is mounted and rotates upon the axle 6 by mechanism known in the art and actuated by the rear supporting wheels. An eccentric 8 is keyed on the axle 6 and is surrounded by an annular member 9 with which is integral a plate 10. A link 11 is rigid with the plate 10 and extends to pivotal connection with an arm 12 radial to a shaft 13 and loosely mounted thereon. A link 14 is pivotally mounted on the plate 10 and is pivotally attached to an arm 15, also radial to the shaft 13 on which it is mounted. The shaft 13 is rotatably journaled in bearings 16 and 17, supported on the sills 1 and 4 respectively, and carries the rear sprockets upon which the conveyor apron 18 is supported.

Loosely mounted on the shaft 13 is a plate 19 extending in opposite directions, equidistant from the shaft 13, and having shoes 20 and 21 concentric with the shaft 13. A link 22 is secured rigidly to the plate 19 and projects approximately at a right angle to the radius thereof, and has its opposite end attached to, or integral with, a bar 23 extending upwardly and curved concentric to the shaft 13. Pivotally attached to the upper end of the bar 23 is a rod 24 which extends to a lever on the forward part of the spreader and convenient to the reach of the driver. Loosely mounted on the hub 25 of the plate 19 is a ratchet wheel 26. The free end of the arm 12 is bent to form a yoke between the arms of which is pivotally mounted a dog 27 which is held in engagement with the ratchet wheel 26 by a coiled spring 28 attached to the end of the arm 12 and to an extension of the dog 27. The free end of the arm 15 has a similar yoke formation in which is mounted a dog 29 held in engagement with the ratchet wheel 26 by a coiled spring 30. A lug 31 is preferably integral with the dog 27, and a similar lug 32 is part of the dog 29, the lug 31 is adapted to ride over the shoe 20 to raise the dog 27, and the dog 29 is actuated in a similar manner by the lug 32 and the shoe 21.

By the mechanism above described the apron 18 is actuated to deliver the contents of the spreader to the beater 7 with more or less speed as may be desired, for as the beater is rotated by power from the rear wheels of the spreader that power is transmitted to operate the apron, by rotation of the eccentric 8, alternately rocking the arms 12 and 15 so that an almost continuous motion is imparted to the apron by the dogs 27 and 29 rotating the ratchet wheel 26, the speed of movement of the apron is regulated by adjustment of the plate 19 to interfere, at a predetermined point, with the movement of the dogs 27 and 29 as they are moved by the arms 12 and 15 to secure a new purchase on the ratchet wheel 26, this interference resulting in the dogs being raised from contact with the ratchet wheel 26 before they have reached the limit of their play for a new contact with the ratchet wheel. Through the mechanism above described, and known in the art, motion is transmitted to the shaft 13 in the following manner:

In the bearing 16 is an annular recess 33 within which is a member 34, keyed on the shaft 13, having lugs 35 projecting from its periphery. A flange 36 on the inner face of the ratchet wheel closes the recess 33, and on the inner face of the wheel, within the flange 36, are lugs 37, having projecting portions 38, which are adapted to extend into the recess 33, the part 39 thereof contacting continuously in normal operation with the faces 40 of the lugs 35, as illustrated in Figure 4, and as the lugs 35 are part of the member 34, keyed to the shaft 13, the shaft is constantly rotated by action of the dogs 27 and 29 turning the ratchet wheel 26, and consequently moving the apron to feed toward the beater 7. On a grade, or in the event the rear wheels of the spreader meet a depression in the ground, the apron may have a tendency to race or feed toward the beater faster than the speed acquired from its normal actuating mechanism, and for the purpose of checking this excess speed, the member 34 is enlarged diametrically for part of its width, as at 41, and adjacent the face 40 of the lugs 35, the part 41 is depressed to form inclined surfaces 42 on which, and against the face 40 of the lugs 35, rests a roller 43. If the speed of the apron is increased by the reasons stated, it is apparent that the rollers 43 will be, because of the inclines 42, forced instantly against the inner periphery of the recess 33 and act as a brake to check the movement of the apron; this braking action is quickly disposed of by the continuous and steady rotation of the ratchet wheel 26, for while, momentarily, the contact of the parts 37 with the lugs 35 will be broken, the rotation of the ratchet wheel will force the rollers out of contact with the inner periphery of the recess 33 and back into normal inert position by pressure from the parts 38, which extend a sufficient distance back of the rollers, and parallel therewith, to not only force the rollers into their normal inert position but also to act to prevent the rollers from angling out of parallelism with the axis of the shaft 13, the space within which the rollers operate being further limited by a lug 44 on the inner face of the wheel and between any two of the lugs 37 and against which an adjacent lug contacts by rotation of the member 34.

What I claim is—

In a feeding device, the combination of a rotary shaft, a second rotary shaft mounted parallel therewith, a bearing for the second shaft, means to actuate the first shaft, mechanism connecting said shafts and operated by the first shaft to actuate the second shaft, a recess in said bearing adjacent said mechanism, a member secured rigidly on said second shaft having lugs extending from its periphery, lugs included in said mechanism extending into said recess in contact with the lugs on said member whereby said second shaft is rotated by operation of said mechanism, rolling elements within said recess adapted to automatically contact with the side thereof and momentarily check the rotation of said second shaft beyond its normal speed, and means to automatically release said contact when the normal speed of said second shaft is restored.

LEONARD B. NEIGHBOUR.